(12) United States Patent
Le Pennec et al.

(10) Patent No.: US 7,369,560 B2
(45) Date of Patent: May 6, 2008

(54) SYSTEM FOR CONVERTING DATA BASED UPON IPV4 INTO DATA BASED UPON IPV6 TO BE TRANSMITTED OVER AN IP SWITCHED NETWORK

(75) Inventors: Jean-François Le Pennec, Nice (FR); Aurélien Bruno, Nice (FR); Claude Galand, La Colle sur Loup (FR); Didier Giroir, Cagnes sur Mer (FR)

(73) Assignee: AT&T Corporation, Bedminster, NJ (US)

( * ) Notice: Subject to any disclaimer, the term of this patent is extended or adjusted under 35 U.S.C. 154(b) by 774 days.

(21) Appl. No.: 10/852,945

(22) Filed: May 25, 2004

(65) Prior Publication Data

US 2005/0025157 A1    Feb. 3, 2005

(30) Foreign Application Priority Data

May 26, 2003    (FR) .................................. 03 06308

(51) Int. Cl.
*H04L 12/28* (2006.01)
*H04L 12/56* (2006.01)

(52) U.S. Cl. .................. 370/395.52; 370/392; 370/401

(58) Field of Classification Search ............. 370/395.5, 370/465, 401, 216, 392, 400, 474, 225, 237, 370/219, 395, 228, 390, 469, 229; 709/220, 709/236, 249, 238, 203, 200; 398/50; 726/15, 726/1

See application file for complete search history.

(56) References Cited

U.S. PATENT DOCUMENTS

| | | | |
|---|---|---|---|
| 6,580,717 B1* | 6/2003 | Higuchi et al. | 370/401 |
| 7,154,889 B1* | 12/2006 | Rekhter et al. | 370/392 |
| 2002/0006133 A1* | 1/2002 | Kakemizu et al. | 370/401 |
| 2002/0136237 A1 | 9/2002 | Tsuchiya | |
| 2003/0088697 A1* | 5/2003 | Matsuhira | 709/238 |
| 2003/0172177 A1* | 9/2003 | Kersley et al. | 709/236 |
| 2004/0066777 A1* | 4/2004 | Vesterinen et al. | 370/352 |

FOREIGN PATENT DOCUMENTS

EP     1298853 A1     4/2003

OTHER PUBLICATIONS

Jeremy De Clercq et al., "BGP-MPLS VPN Extension for IPv6 VPN", Internet Draft, http://pddocserv/specdocs/data/standards/telecom/ietf/drafts/draft-ietf-ppvpn-bgp-ipv6-vpn-03.txt, Nov. 2002, pp. 1-13, XP-002270869.

* cited by examiner

*Primary Examiner*—Wing Chan
*Assistant Examiner*—Prenell Jones
(74) *Attorney, Agent, or Firm*—Michael Haynes PLC; Micahel N. Haynes

(57) ABSTRACT

Certain exemplary embodiments provide a method for converting data packets based upon IPv4 protocol into data packets based upon IPv6 protocol, said method comprising converting any data packet based upon the IPv4 protocol into a data packet based upon the IPv6 protocol before transmitting it to an IP switched network using information provided by an external server, and converting any data packet based upon the IPv6 protocol provided by said IP switched network into a data packet based upon the IPv4 protocol before transmitting it to a first or second workstation.

4 Claims, 3 Drawing Sheets

| 3 | 13 | 8 | 24 | 16 | 64 |
|---|----|---|----|----|----|
| FP | TLA ID | RES | NLA ID | SLA ID | INTERFACE ID |

| 3 | 13 | 8 | 24 | 16 | 32 | 32 |
|---|----|---|----|----|----|----|
| FP | PRO ID | PE | VPN ID | LOC ID | HOST ID | IPv4 ADD |

SYSTEM FOR CONVERTING DATA BASED UPON IPV4 INTO DATA BASED UPON IPV6 TO BE TRANSMITTED OVER AN IP SWITCHED NETWORK

CROSS-REFERENCE TO RELATED APPLICATIONS

This application claims priority to pending French patent application Serial No. 0306308 filed 26 May 2003.

SUMMARY

Certain exemplary embodiments provide a method for converting data packets based upon IPv4 protocol into data packets based upon IPv6 protocol, said method comprising converting any data packet based upon the IPv4 protocol into a data packet based upon the IPv6 protocol before transmitting it to an IP switched network using information provided by an external server, and converting any data packet based upon the IPv6 protocol provided by said IP switched network into a data packet based upon the IPv4 protocol before transmitting it to a first or second workstation.

BRIEF DESCRIPTION OF THE DRAWINGS

A wide variety of potential embodiments will be more readily understood through the following detailed description, with reference to the accompanying drawings in which.

DETAILED DESCRIPTION

Figures 1, 2A, 2B:
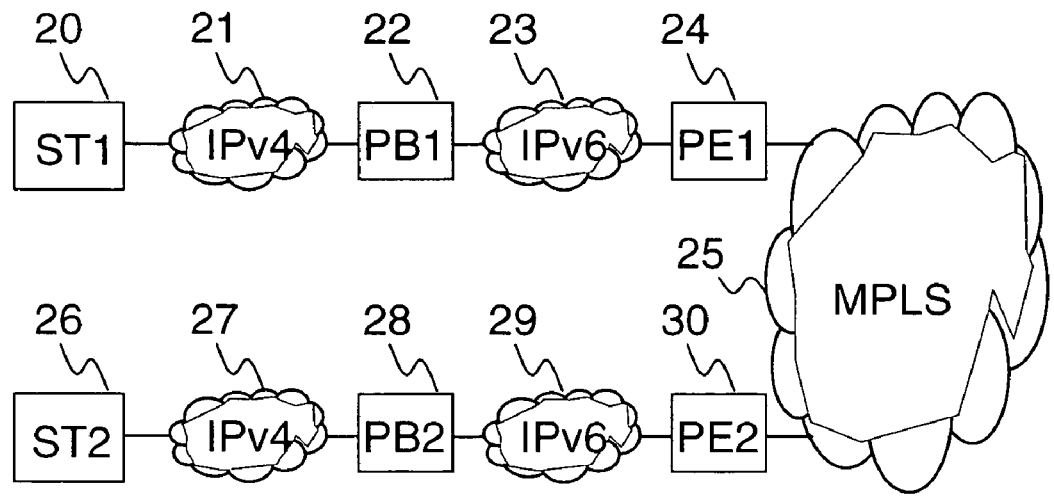
FIG. 1 represents an exemplary embodiment of a data transmission system.
FIGS. 2A and 2B represent respectively the IPv6 aggregatable global unicast address and certain exemplary modifications thereto.

There are more and more Virtual Private Networks (VPNs) being implemented to enable private communications among devices, even if some or all these communications are transmitted over a public network. Most VPNs are built to support as layer 3 the IP protocol rules and mainly the IPv4 flavor of the IP protocol.

There is today a problem with the IPv4 protocol that is raised by the well-known limitation of the address space within IPV4, and also a problem raised by the forwarding rules of IPv4 wherein the routing actions are based on the destination address without any influence due to the source address. Since any IPv4 network can be located anywhere in the world, the routers must maintain a record for every active network. This is not only true for the Internet network, but also for VPNs, intranets, and extranets.

The real, long term solution to these problems is a much larger address space, allowing for more addressing structure, less stringent allocation policies, and more efficient routing. This is what IPv6 offers, which makes it attractive for backbone usage. The IP scalability and ease of management are some of the objectives of IPv6. But as all the devices are not v6, there is a need to find mechanisms to take advantage of v6 today. In addition, current proposed uses of IPv6 headers are not really associated with the label switching and VPN support capability of protocols like Multi-Protocol Label Switching (MPLS).

Native use of IPv6 based only on IPv6 address fields is even more complex than IPv4, if route filtering is used to provide connectivity and build VPNs due to the length of the address field on which a lookup should be performed. Such a "route filtering" can be implemented to control route propagation such that certain networks receive routes for other networks within their own community of interest (i.e., VPN).

Route filtering is based on the proposition that some network subset of an underlying IP network supporting the VPN (such as the Internet) actually forms the VPN. Routes associated with this network subset are filtered such that they are not announced to any other network(s) connected to the network subset forming the VPN. Conversely, no other non-VPN route is announced to the network subset. Route filtering on IPv4 implies that VPNs use different address spaces. IPv6 simplifies this filtering since VPNs are identified in the IP address field but opens a security hole.

For privacy of services on a network-layer, route-filtering VPN is implemented by restricting any of the VPN hosts from responding to packets that contain source addresses from outside the VPN. Such restrictions are based on access control lists ("ACLs"), which are tables that tell a device which access rights each user has. That is, an ACL is a list of entries that grant or deny specific access rights to individuals or groups.

Route filtering VPNs, however, have various difficulties associated therewith.

For example, such an arrangement can be wrongly configured such that it erroneously accepts packets, which it should not, and/or rejects packets that should be accepted. Another problem with route filtering is that, when implemented behind a gateway or firewall device, subscriber networks can define a router external to the gateway/firewall as the default router, so that users of the VPN behind the gateway/firewall can reach external networks as long as they know the default router address (even if it is not advertised). Additional shortcomings of this technique include administrative mistakes, a static nature of the design and limitations on the security provided. In addition, the complexity for defining and maintaining all the rules is very high, so that the technique does not scale very well or very easily.

Various solutions have been put forward to achieve different levels of network privacy when building VPNs across a shared IP backbone. Many of these solutions require separate, per VPN forwarding capabilities, and make use of IP or MPLS-based tunnels across the backbone. Such tunnels add overhead and management complexity especially in tunnel peer devices. Also, within a VPN domain, an instance of routing is used to distribute VPN reachability information among routers. Any routing protocol can be used, and no VPN-related modifications or extensions are needed to the routing protocol for achieving VPN reachability.

Regardless of which of the above techniques (or other known techniques) is used to form a VPN, it should be understood that network security is a concern.

In fact, network security is a concern in many contexts aside from VPNs, and, in general, increasing use of remote access over public networks and Internet access for inter-business communication are major driving forces behind the evolution of security technology.

Many techniques for network security revolve around the use of a firewall, which is generally known as a combination of hardware and software used to implement a security policy governing network traffic between two or more networks, some of which being under administrative control (e.g., organizational networks) and some of which being not under administrative control (e.g., the Internet).

Regardless of the routing technique used, the routing mechanism is usually not used to implement security policy. That is, a routing mechanism is often considered too dynamic and unreliable to perform security functions. Routing functions and supporting structures are primarily designed to route packets efficiently and reliably, not securely. Therefore, filtering techniques that can be implemented in connection with operation of a firewall (and/or router) for security purposes exist, and examples of these (as referred to above) are packet filtering, application proxies, and dynamic filtering (stateful inspection). The fields on which filtering is applied should be trusted fields, which cannot be easily the case with IPv4 header types. One of such trusted fields is the VPN ID type.

Although there are many techniques for implementing and securing individual VPNs, as discussed above, there is an additional need for VPNs that can cross-communicate without sacrificing service to their users, e.g., without reducing the security of transmissions between the two (or more) VPNs or within a particular VPN.

An exemplary embodiment of a system is illustrated in FIG. 1. In such a system, two workstations 20 and 26 exchange data through an IP switching network 25. Such a network is, in a preferred embodiment, based upon MPLS (Multi Protocol Label Switching) protocol, which is an IP technology defining PE (Provider Edge) devices that define a physical path across the network for each customer flow, such a path being defined as a set of labels that are swapped along the path from an ingress PE such as PE1 24 to an egress PE such as PE2 30.

In IP switched network 25, which is preferably a MPLS network as already mentioned, several VPNs are implemented between the edge devices 24 and 30. The environment can be related to how a specific VPN can be established and securely identified using layer 3 mechanisms like the one proposed in IPv6 protocol.

It is assumed that the data packets sent by each workstation 20 and 26 are based upon IPv4. Therefore, the workstations are each connected to an IPv4 network respectively network 21 for workstation 20 and network 27 for workstation 26. The IPv4 data flow sent from workstation 20 is then converted, as described hereunder, by a packet builder PB1 22 into an IPv6 data flow. The packets are forwarded to ingress PE1 24 through an IPv6 network 23, and then transmitted through network 25 using the label switching if this network is a MPLS network.

At the output of network 25, the data packets in IPv6 are received by PE2 30 and transferred to a packet builder PB2 28 through an IPv6 network 29. The packets that have been converted, as described hereunder, from IPv6 to IPv4 are forwarded to workstation ST2 28 through an IPv4 network 27. This data flow can reversed for the packets forwarded from workstation 26 to workstation 20.

In certain exemplary embodiments, an IP header can be used that is derived from the IP header proposed by the IETF (Engineering Task Force) in RFCs 2373 and 2374 which is illustrated in FIG. 2A. The format of this global aggregatable unicast address is designed to support both the current provider based aggregation and a new type of aggregation used for the exchanges. The combination can allow efficient routing aggregation for both sites, which connect directly to the providers. Sites have the choice to connect to either type of aggregation point.

Globally, in the address format illustrated in FIG. 2A, the first 48 bits are related to the public technology, the next 16 bits are related to the site topology and the remaining 64 bits are related to the interface identifier. The fields are the following:

FP Format Prefix (3 bit) for aggregatable global unicast addresses
TLA ID Top-Level Aggregation Identifier
RES Reserved for future use
NLA ID Next-Level Aggregation Identifier
SLA ID Site-Level Aggregation Identifier
INTERFACE ID Interface Identifier This basic structure is re-used to provide a transparent use of IPv6 mechanisms such as the address lookup (longest prefix match). The mechanism used to build the IPv6 format from the IPv4 format is static and manually set in the edge devices.

Certain exemplary embodiments relate to a new Ipv6 format, illustrated in FIG. 2B, wherein the fields can be any of the following:

The provider ID (e.g., AT&T),
The PE field including the number on the PE device attached to the IP switched network (e.g., 24 or 30). The way the PE field is defined is also part of the proposal and can include several methods: known active topology provided by network management tools, discovery at IP level: Traceroute+PE database with dynamic or regular update techniques, given by MPLS tools, forced or predefined,
The VPN ID which may be subdivided into areas to provide a hierarchical VPN structure,
Location ID which is the geographic location of the site,
Host ID which refers to the device that uses the corresponding IPv4address. The host may be a server, a client, a router, a firewall. Different rules may then be applied. In the preferred embodiment, it is the MAC address if this MAC address can be discovered and checked. It provides a unique identification that gives a supplementary privacy information. Host ID on the IPv6 address field may either contain the MAC address corresponding to the IPv4 address or just an equivalent ID and the correspondence between them is just maintained locally.
IPv4 address (source or destination) which is present in the incoming packet.

Certain exemplary embodiments can simplify the label distribution and management for VPN (MPLS VPN) since the destination PE is included in the destination address field of the new IPv6 header. A VPN Label per flow may be used instead of flow aggregation into labels insofar as there is no longer a need for a dual label implementation like what is done in a MPLS VPN. Using this method, a packet entering the MPLS network 25, for example on PE1, directly provides in its IPv6 header the destination PE such as PE2. There is no need for special path identification, particularly if PE1 knows how to reach PE2.

Finally, for routing in the IP switched network, only the MSB bytes of the address field need be used while on the access only the LSB bytes are used. This can simplify the address lookup mechanism even at PE level, which was one of the potential drawbacks of IPv6 since, normally, a 128 bit address lookup is required. Current PEs supporting IPv6 as input protocol may be used but may also be improved in identifying the sub-fields in the MSB part of the IPv6 address field in order to directly use the PE address for routing packets.

The MPLS network does not need to implement any additional VPN feature such as MPLS VPN as the privacy can be insured by the IPv6 header that contains the VPN ID. As this field is not set by the user but by the Packet Builder device PB1 or PB2, there is no risk to have spoofing from user defined IPv6 flows. This is a security improvement that can be worth using even for native IPv6 incoming flows. Any or all secure fields can be validated, added, or replaced at the ingress node of the network. Such fields can include Provider field, PE field, VPN ID field, LOCATION ID field and HOST ID field if it is used also for filtering. When an IPv6 packet is received, it may be analyzed to verify that its header structure matches the local rules, which prevents such an IPv6 spoofing. If it doesn't match, depending on fields and rules, it may be either modified or discarded. If modified, a swap table can be built to rebuild the original address field for incoming packets from the network such as a stateful mechanism. It can work, in that case, like an IPv6 NAT to convert IPv6 flows that do not match the proposed rules transparently. Such a conversion can be performed in PB devices.

Certain exemplary embodiments can improve the routing scalability. The network management of such an implementation can be simpler since the IP header contains fields to manage a flow, which is not the case today with IPv4 on one side and MPLS on the other side. It also can provide an increased security.

As far as MPLS is concerned, current vendor and standard bodies are working on IPv6 through MPLS called 6PE, which reuses v4 MPLS VPN mechanisms. Certain exemplary embodiments can replace the v4 based MPLS and BGP mechanisms by native v6 mechanisms but it is still compatible with 6PE solution as an intermediate implementation. Introducing MPLS VPN knowledge in the IPv6 header can converge into a single transmission element all the desired information at any point in the network. MPLS to MPLS inter-working can also become easier to implement and manage in a more secure way insofar as the IPv6 header will contain the desired crossover information and no need to bridge at the label level is required.

Figure 3:
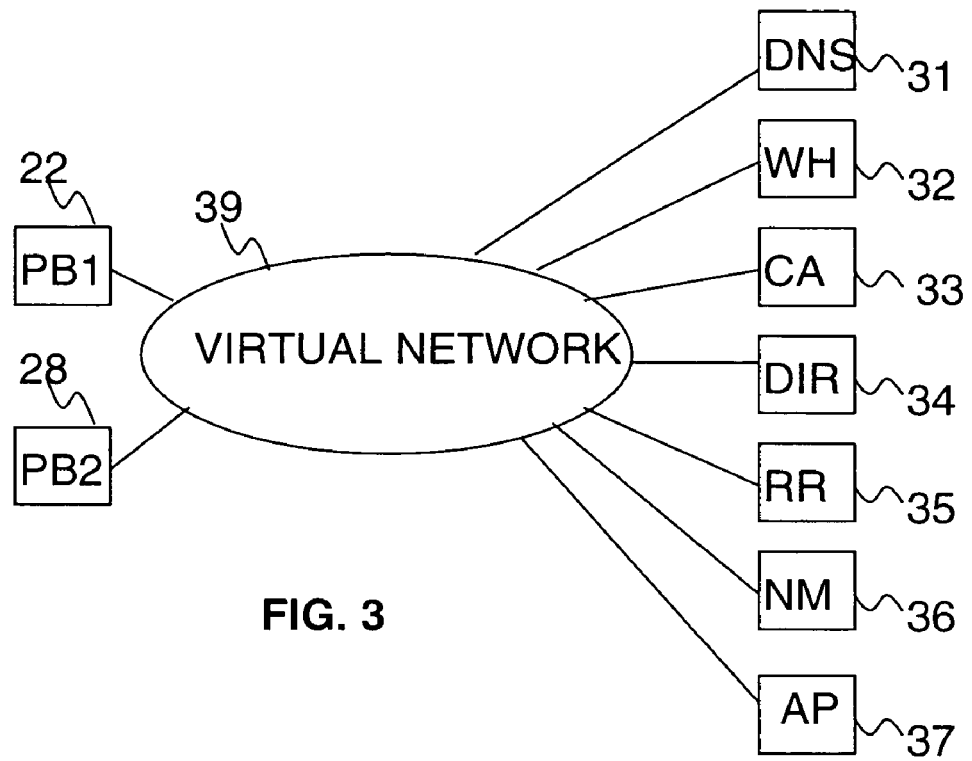
FIG. 3 shows exemplary packet builders connected to the information servers by the intermediary of a virtual network.

For implementing certain exemplary embodiments, servers can be used that will give the value of each field for the source and destination addresses in a secure way. These servers include DNS, Whois, Route reflectors and also Certificate Authority since the IPv6 address has to be securely given. FIG. 3 represents the logical connections of packet builders 22 or 28 to such server devices 31 to 37 by means of a virtual network 39 that can be IPv4 network 21 or 27, IPv6 network 23 or 29, the MPLS network 25, or any other network connected to one of these networks or directly connected to the packet builder.

The IPv6 source or destination address reconstitution is a method for building IPv6 packets using IPv4 packets.

Inverse DNS lookup on DNS server 31 and Whois lookup on server 32 are used to identify the location of the destination device and the owner (ISP/customer). Both are used to set the LOC ID field and the VPN ID field.

Certificate request on Certificate Authority (CA) server 33 is used to validate source and/or destination IP addresses IPv4 and HOST ID for security purposes. It may be used in addition or as a replacement of DNS and Whois servers.

A Directory server 34 contains the allowed subnets and authorized HOST IDs but not using certificates as an alternate method for Certificate use. This server or the CA may also provide the VPN ID if more than one VPN is supported on an interface. Otherwise, the VPN ID may be defined just by the interface using a one to one mapping static table as it is done today with one physical or logical (generally a virtual circuit) corresponding to a single VPN.

A Route Reflector RR 35 provides the PE field value for the destination address. The source address is filled with the locally attached PE identification field. RR solves the routing over the IP switching infrastructure using any kind of routing techniques that allows to provide routing for VPN groups or type of flows.

A network management tool NM 36 provides filtering rules that can be dynamically applied if desired. PB can be the right place to put filtering rules at the network ingress point in order to avoid spoofing, for example. NM can identify attacks on the destination network and find from which ingress point these packets are sent and take appropriate measures.

An ARP proxy AP 37 provides the MAC address of the sending device if this function is used for improved security and device identification. In some cases, the proxy can just be the default access router when no other routers are in between. In that case, such a router can be enabled to answer to ARP requests. The MAC address may also be pre-stored in DNS or Directory Server or in a Certificate. An ARP proxy or ARP request to the default router can allow the MAC address to be dynamically validated against the source IP address of the flow. So, for example, a known MAC address may be granted even if it is not connected on the regular LAN network. An unknown MAC address from all servers may be forbidden to connect to some networks as another example of rule.

The IPv6 fields to be filled this way can include the source address and the destination address. The figure shows an implementation where both PB devices have access to all servers in order to get information for both source and destination address fields. An alternate implementation is for the local Route Reflector to provide the IP address of the destination Packet builder (like PB2) when PE2 is given as the destination in order for PB 1 to get destination information directly from PB2 and not from the servers. Such an implementation can provide improved performance since each Packet builder device maintains a list of all locally accessible devices with associated parameters. Thus, in one call to the remote PB, all information may be provided. If the remote PB doesn't have this device in its cache, it will join the servers to get it. This analysis need only be done once per flow (on the first packet) and the level of analysis performed may depend on the network on which the packet should be sent to. In fact, it is less than once per flow insofar as only the source part (or the destination part if new) is processed and information is kept in a cache, which minimizes performance impact of such an implementation.

Figure 4:
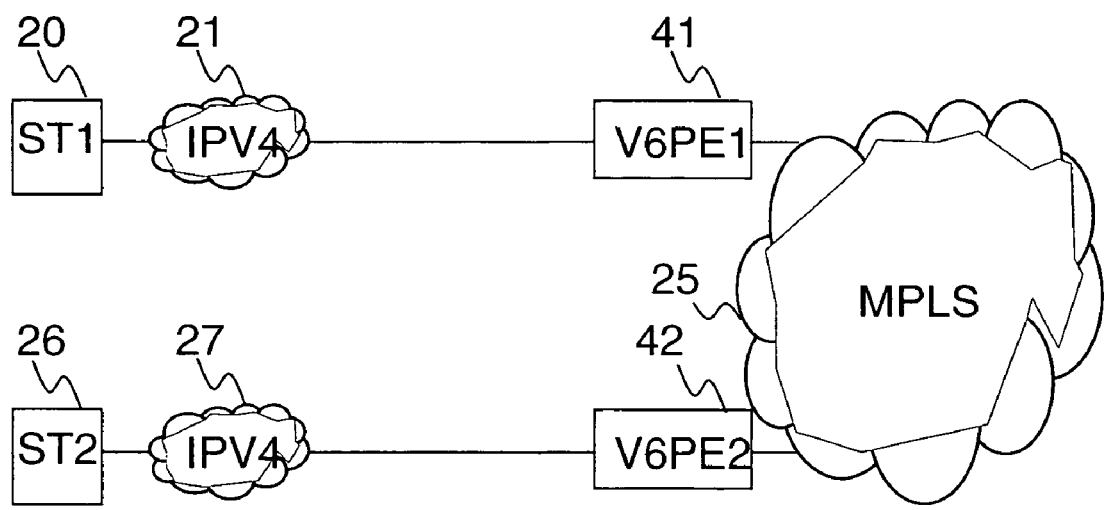
FIG. 4 represents an exemplary embodiment wherein the function of the packet builder is integrated in the PE device.

According to another embodiment, the packet builder is integrated in the PE device as illustrated in FIG. 4. In such a case, there need be no IPv6 network as in the general embodiment illustrated in FIG. 1. Instead, the packet builder and the PE device constitute a single block, that is the block V6 PE1 41 replacing PB1 22 and PE1 24 and the block V6 PE2 replacing PB2 28 and PE2 30.

This implementation also can be used to perform the function on the PE itself, which can be more efficient since the PE field of the address can be directly used by the PE for forwarding on the MPLS core without additional path discovery and additional level of Label like on MPLS VPN. In fact, a label may be used as a compressed header instead of transmitting the full IPv6 header, which means one label by transmission flow. The transmission of both (label followed by a full IPv6 header) would be redundant but possible. Several compatible implementations may be used in the core for packet transmission using IP switching labels. One goal can be to recover at the egress PE or PB the original IPv6 header on each packet.

Figure 5A:
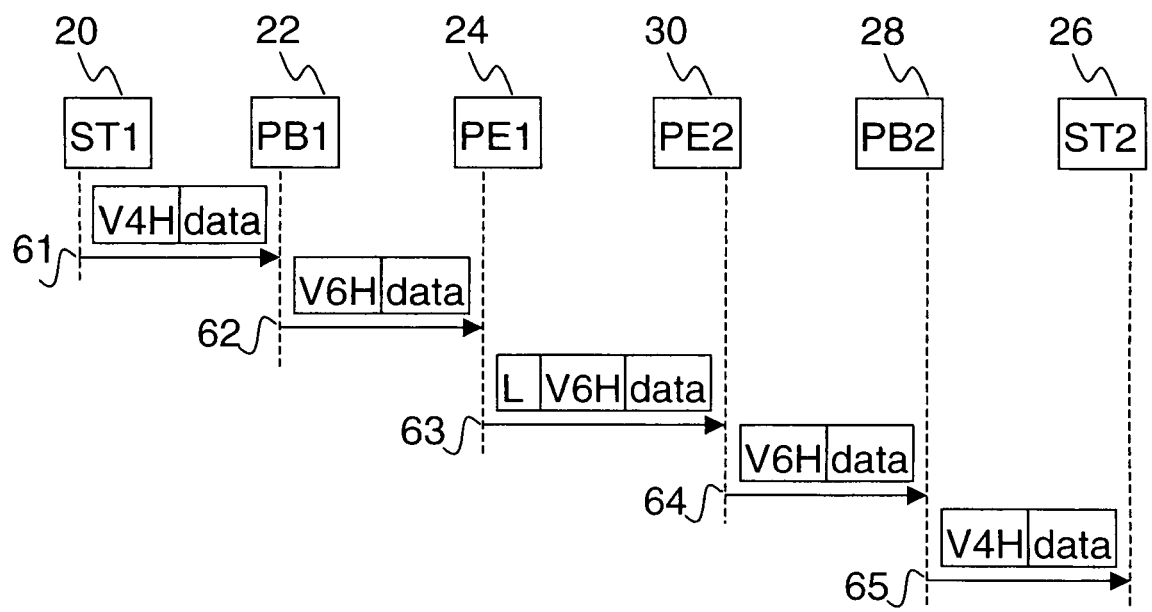
FIGS. 5A and 5B represent respectively an exemplary change of the data packet structure as it flows from the source to the destination.

The change of the data packet as it flows from the sending workstation to the receiving workstation is illustrated in FIG. 5A. In workstation 20, the data packet is a standard IPv4 packet format with an IPv4 header and a data payload. The packet is sent to PB 1 device at step 61. The packet builder validates the IPv4 header fields and finds, thanks to the servers defined in FIG. 3, the value for the fields used to build the corresponding IPv6 header. It mainly includes the IPv6 destination address and the IPv6 source address. PB 1 can perform additional filtering if defined.

The new packet is forwarded to PE1 at step 62. PE1 identifies the destination PE and forwards the packet to PE2 at step 63. PE1 can add a label such as a MPLS label for improving the packet switching in the core. PE2 receives the packet and removes the switching label if present. It then forwards the packet to PB2 at step 64 which first can again perform filtering and then remove the IPv6 header and easily rebuild the IPv4 packet insofar as the IPv6 packet header contains all the desired fields. This IPv4 packet is then forwarded to the destination workstation 26 on step 65.

It should be noted that this process might seem complex but, in certain embodiments, can be fully performed only once especially on PB1 and PB2. Further packets of the same flow may just need header fields swapping using the same field values. Therefore a swap table can be implemented on Packet Builders to speed up the processing of swapping headers.

Rebuilding or adding packets checksums and rebuilding other IPv4 header fields are not detailed here insofar as these functions may be done using standard rules and translation mechanisms such as RFC2766 or other IETF RFCs or drafts.

Figure 5B:
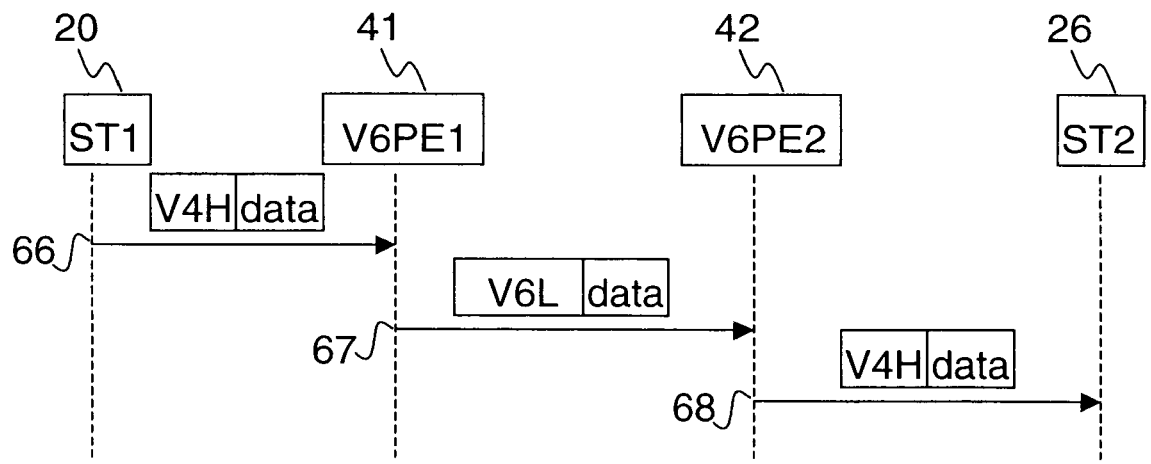

If the second embodiment wherein the function of the packet builder is integrated in the PE device is used, the flow of the data packet (and the structure change) as illustrated in FIG. 5B is simplified but very similar to the data flow of the general embodiment.

What is claimed is:

1. A system for converting data packets based upon an IPv4 protocol into data packets based upon an IPv6 protocol to be transmitted over a multiple Virtual Private Network (VPN) infrastructure in a data transmission system comprising an IP switched network to which are connected a first workstation via a first Provider Edge (PE) device and a second workstation via a second PE device, said workstations operating with the IPv4 protocol whereas said IP switched network operates with the IPv6 protocol; said system comprising:
   a first packet builder between said first workstation and said IP switched network for converting any data packet based upon the IPv4 protocol received from said first workstation and transmitted to said IP switched network into the IPv6 protocol;
   a second packet builder between said IP switched network and said second workstation for converting saw data packet based upon the IPv6 protocol received from said IP switched network and transmitted to said second workstation into the IPv4 protocol; and
   at least one server accessed by each of said first packet builder and said second packet builder for providing thereto information necessary to convert a data packet based upon the IPv4 protocol into a data packet based upon the IPv6 protocol; wherein any data packet that has been converted into the IPv6 protocol by one of said packet builders comprises a packet header comprising a PE field corresponding to a PE to be used either as source PE or destination PE and a VPN identification field related to an IPv4 address that was in said packet header before the conversion.

2. The system according to claim 1, wherein any data packet that has been converted into the IPv6 protocol by one of said first packet builder and said second packet builder further includes a LOC identification field referring to a geographic location of a site and a HOST identification field referring to a workstation that transmitted said data packet.

3. A method for converting data packets based upon an IPv4 protocol into data packets based upon an IPv6 protocol to be transmitted over a Virtual Private Network (VPN) in a data transmission system comprising an IP switched network to which are connected a first workstation via a first Provider Edge (PE) device and a second PE device, said workstations operating with the IPv4 protocol whereas said IP switched network operates with the IPv6 protocol said method comprising;
   converting any data packet based upon the IPv4 protocol into a data packet based upon the IPv6 protocol before transmitting the data packet to said IP switched network using information provided by an external server, and
   converting any data packet based upon the IPv6 protocol provided by said IP switched network into a data packet based upon the IPv4 protocol before transmitting the data packet to said first or second workstation,
   wherein any converted data packet comprises a packet header comprising a PE field corresponding to a PE to be used either as a source PE or as a destination PE and a VPN identification field related to an IPv4 address that was in said packet header before the conversion.

4. The method according to claim 3, wherein any data packet that has been converted into the IPv6 protocol further includes a LOC identification field referring to a geographic location of a site and a HOST identification field referring to a workstation that has transmitted said data packet.

* * * * *